(12) United States Patent
Mieda et al.

(10) Patent No.: US 10,988,646 B2
(45) Date of Patent: Apr. 27, 2021

(54) ADHESIVE COMPOSITION, AND METHOD OF BONDING AN ADHEREND AND METHOD OF PRODUCING A STACK, EACH OF WHICH USES THE SAME

(71) Applicant: FURUKAWA ELECTRIC CO., LTD., Tokyo (JP)

(72) Inventors: Tetsuya Mieda, Tokyo (JP); Takumi Asanuma, Tokyo (JP); Yasushi Ishizaka, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 314 days.

(21) Appl. No.: 16/008,675

(22) Filed: Jun. 14, 2018

(65) Prior Publication Data
US 2018/0291242 A1    Oct. 11, 2018

Related U.S. Application Data

(63) Continuation of application No. PCT/JP2016/072612, filed on Aug. 2, 2016.

(30) Foreign Application Priority Data

Dec. 18, 2015 (JP) .............................. JP2015-247963

(51) Int. Cl.
*C09J 163/00* (2006.01)
*C09J 5/00* (2006.01)
(Continued)

(52) U.S. Cl.
CPC ............ *C09J 163/00* (2013.01); *B32B 27/38* (2013.01); *C08F 2/48* (2013.01); *C08G 59/22* (2013.01);
(Continued)

(58) Field of Classification Search
CPC .. C09J 163/06; C09J 163/00; C09J 2301/416; C09J 133/10; C09J 11/06; C09J 5/00;
(Continued)

(56) References Cited

U.S. PATENT DOCUMENTS 5,476,748 A    12/1995 Steinmann et al.
6,376,070 B1 †  4/2002 Nakasuga
(Continued)

FOREIGN PATENT DOCUMENTS

CN    1384975 A    12/2002
CN    1434834 A    8/2003
(Continued)

OTHER PUBLICATIONS

Chinese Office Action and Search Report, dated Sep. 6, 2019 for corresponding Chinese Application No. 201680009267.4, with an English machine translation of the Chinese Office Action.
(Continued)

*Primary Examiner* — Sanza L. McClendon
(74) *Attorney, Agent, or Firm* — Birch, Stewart, Kolasch & Birch, LLP

(57) ABSTRACT

An adhesive composition, having: a polyalkylene oxide-added polyfunctional epoxy compound (a) represented by formula (A); a polyfunctional (meth)acrylate monomer (b), and a photo-acid generator (c); a method of bonding the adherends and a method of producing a stack, each of which uses the same:

Formula (A)

(Continued)

wherein R designates a lower alkylene group (e.g. an alkylene group having 1 to 4 carbon atoms); X designates a divalent linking group having a ring structure and 6 to 20 carbon atoms, or a lower alkylene group (e.g. an alkylene group having 1 to 4 carbon atoms); and m and n each are 0, or a positive number, independently.

4 Claims, 1 Drawing Sheet

(51) Int. Cl.
    *C08G 59/22*     (2006.01)
    *C08G 59/68*     (2006.01)
    *B32B 27/38*     (2006.01)
    *C08F 2/48*     (2006.01)
    *C08G 59/42*     (2006.01)
    *C08L 71/02*     (2006.01)
    *C09J 133/08*     (2006.01)
    *C09J 133/10*     (2006.01)

(52) U.S. Cl.
    CPC ......... *C08G 59/4261* (2013.01); *C08G 59/68* (2013.01); *C08L 71/02* (2013.01); *C09J 5/00* (2013.01); *C09J 133/08* (2013.01); *C09J 133/10* (2013.01); *B32B 2405/00* (2013.01); *C08F 2500/17* (2013.01); *C08F 2800/20* (2013.01); *C08L 2205/05* (2013.01); *C09J 2301/416* (2020.08)

(58) Field of Classification Search
    CPC ...... C08L 33/06; C08L 2205/05; C08L 71/02; B32B 7/12; B32B 7/00; B32B 2457/208; B32B 2457/20; B32B 2457/10; B32B 2457/08; B32B 2405/00; B32B 2307/748; B32B 2307/54; B32B 2250/02; B32B 37/12; B32B 27/38; B32B 27/36; B32B 27/325; B32B 27/281; B32B 27/08; B32B 17/1055; B32B 15/09; B32B 15/085; B32B 15/08; C08G 59/68; C08G 59/4261; C08G 59/22; C08F 2800/20; C08F 2500/17; C08F 2/48
    USPC ....................................................... 522/170
See application file for complete search history.

(56) References Cited

U.S. PATENT DOCUMENTS

| | | | |
|---|---|---|---|
| 6,790,310 | B2 * | 9/2004 | Nakasuga .................. C09J 7/10 156/275.5 |
| 6,995,193 | B1 | 2/2006 | Fukui |
| 7,969,260 | B2 * | 6/2011 | Raty ..................... H01P 1/2053 333/203 |
| 2003/0026979 | A1 | 2/2003 | Nakasuga et al. |
| 2013/0279003 | A1 | 10/2013 | Seo et al. |
| 2014/0072731 | A1 | 3/2014 | Seo et al. |
| 2016/0280964 | A1 | 9/2016 | Suwa et al. |

FOREIGN PATENT DOCUMENTS

| | | |
|---|---|---|
| JP | 04-181944 A | 6/1992 |
| JP | 06-228413 A | 8/1994 |
| JP | 10-306140 A | 11/1998 |
| JP | 2004-189895 A | 7/2004 |
| JP | 2008-013721 A | 1/2008 |
| JP | 2008-231168 A | 10/2008 |
| JP | 2009-221370 A | 10/2009 |
| JP | 2010-144058 A | 7/2010 |
| JP | 2010-209126 A | 9/2010 |
| JP | 2013-213078 A | 10/2013 |
| JP | 2014-500984 A | 1/2014 |
| JP | 2015-022278 A | 2/2015 |
| JP | 2015-040278 A | 3/2015 |
| JP | 2015-040283 A | 3/2015 |
| JP | 2015-098513 A | 5/2015 |
| JP | 2015-180968 A | 10/2015 |
| JP | 2015-229744 A | 12/2015 |
| KR | 20070067954 A † | 6/2007 |
| WO | WO 00/79582 A1 | 12/2000 |
| WO | WO 2011/013663 A1 | 2/2011 |
| WO | 2012173055 A1 † | 12/2012 |
| WO | WO 2012/173054 A1 | 12/2012 |
| WO | WO 2015/087807 A1 | 6/2015 |

OTHER PUBLICATIONS

International Search Report for PCT/JP2016/072612 (PCT/ISA/210) dated Nov. 1, 2016.
Office Action dated Aug. 9, 2016 for Japanese Patent Application No. 2015-247963.
Office Action dated Dec. 6, 2016 for Japanese Patent Application No. 2015-247963.
Office Action dated May 10, 2016 for Japanese Patent Application No. 2015-247963.

\* cited by examiner
† cited by third party

ADHESIVE COMPOSITION, AND METHOD OF BONDING AN ADHEREND AND METHOD OF PRODUCING A STACK, EACH OF WHICH USES THE SAME

CROSS-REFERENCE TO RELATED APPLICATIONS

This application is a Continuation of PCT International Application No. PCT/JP2016/072612 filed on Aug. 2, 2016, which claims priority under 35 U.S.C. § 119 (a) to Japanese Patent Application No. 2015-247963 filed in Japan on Dec. 18, 2015. Each of the above applications is hereby expressly incorporated by reference, in its entirety, into the present application.

TECHNICAL FIELD

The present invention relates to an adhesive core position, and a method of bonding an adherend and a method of producing a stack, each of which uses the same.

BACKGROUND ART

In a display field in recent years, developments have been advanced on a display difficult to cause cracking even if dropped, a bendable or windable display, a stretchable display, or the like, by progress of a technology, such as more reduction and thickness reduction of a display, and use of a resin to replace a material of a display.

Specific examples of the bendable display include a liquid crystal display, an organic EL display, and an electronic paper. These displays are prepared, by stacking (or bonding) a member, such as a touch panel, a protective film, and a polarizing plate, on a display substrate. Thus, as an adhesive for stacking the display substrate or each member thereon, proposals have been made on an adhesive material having features of high flexibility or bending resistance (or flex resistance or flex endurance).

However, an ultraviolet absorber is incorporated into an optical film to be used in the polarizing plate for the purpose of preventing a liquid crystal or a polarization film from ultraviolet degradation (for example, see Patent Literature 1). Thus, difficulty exists in developing desired adhesive characteristics by using a photocurable acrylic adhesive which is cured by irradiation with ultraviolet light in an application in which the polarizing plate is stacked on the display substrate.

That is, even if the photocurable acrylic adhesive is applied onto the polarizing plate or the display substrate, and the display substrate or the polarizing plate is stacked on the applied adhesive, and then the resultant stack is irradiated with ultraviolet light from a side of the polarizing plate, the ultraviolet light is absorbed by the ultraviolet absorber in the polarizing plate, and the photocurable acrylic adhesive is not sufficiently cured.

On the other hand, when the polarizing plate and the display substrate are stacked, and the resultant stack is irradiated with ultraviolet light from a side of the display substrate, the display substrate needs be transparent, and even if the display substrate is transparent, a dye contained in a color filter or the like may be apt to be decomposed or deteriorated by strong ultraviolet light.

Moreover, even if an attempt is made on irradiating the photocurable acrylic adhesive with ultraviolet light, and then stacking and bonding the polarizing plate and the display substrate, a curing reaction of the photocurable acrylic adhesive is rapidly completed, to be solidified. Thus, such an attempt has a problem of incapability bonding the polarizing plate and the display substrate.

The photocurable acrylic adhesive has the above-described problem, and therefore studies have been conducted on a method of using a pressure-sensitive temporally adhesive. The pressure-sensitive temporally adhesive has a low elastic modulus, and therefore adhesion can be caused by pressurization for a short period of time at ordinary temperature, and the polarizing plate and the display substrate can also be stacked without curing the adhesive. However, in this case, if the number of times of bending the display is increased with regard to the bendable display, a thickness of the adhesive (pressure-sensitive temporally adhesive) in a bent portion is possibly changed because of the low elastic modulus. Thus, proposals have also been made on a photocurable adhesive sheet in which sufficient pressure-sensitive adhesive property is exhibited, even in an initial state, by an acrylic pressure-sensitive temporally adhesive component polymerized with visible light in advance, an unreacted epoxy compound is cured by irradiation with ultraviolet light upon stacking both, and sufficient adhesion strength is developed (for example see Patent Literature 2).

In addition thereto, studies have also been conducted on a method of using a liquid adhesive. However, with regard to the liquid adhesive, an excessive liquid adhesive runs off upon roll stacking, to stain facilities in several cases. Moreover, there is caused a problem, such as remaining of gas bubbles and difficulty in keeping uniformity of a thickness of an adhesive layer. Thus, in order to prevent occurrence of cracks by heating, bending, or the like, proposals have also been made on a curable resin sheet containing a polyfunctional cationically polymerizable oligomer, a cationic polymerizable polymer having a molecular weight over 100,000, and a curing agent (for example, see Patent Literature 3).

CITATION LIST

Patent Literatures

Patent Literature 1: JP-A-2015-18096 ("JP-A" means unexamined published Japanese patent application)
Patent Literature 2: JP-A-H10 (1998)-306140
Patent Literature 3: WO 15/087807

SUMMARY OF INVENTION

Technical Problem

The present invention is contemplated for providing an adhesive composition which satisfies various performances for stacking a member having a light blocking effect (particularly, ultraviolet light blocking effect) on a bendable display, a method of bonding an adherend using the same, and a method at producing a stack using the same.

That is, the present invention provides an adhesive composition which can be applied onto an adherend by various methods, such as spraying or inkjet application, upon applying the adhesive composition thereunto, wherein the thus-applied adhesive composition is excellent in unevenness followability to the adherend. Moreover, the present invention provides an adhesive composition in which dripping of an adhesive composition and a change in thickness of application are suppressed by irradiation with ultraviolet light after being applied thereonto and sufficient working life (time in which working can be made after start of curing the adhesive composition by irradiation with light) is ensured. Further, the present invention is contemplated for providing an adhesive composition which is bent in following various adherends after being cured, and is not peeled therefrom. Furthermore, the present invention is contemplated for providing: a method of bonding an adherend, wherein, in preparation of a bendable member such as a display, various adherends particularly, the member having the light blocking effect) can be efficiently bonded by using the above-described adhesive composition that is excellent, in various performances; and a method of producing a stack formed by bonding the adherends.

Solution to Problem

The inventors of the present invention have found that an adhesive position, which contains a polyalkylene oxide-added polyfunctional epoxy pound being a specific compound and a polyfunctional (meth)acrylate monomer, and a photo-acid generator, can be preferably used upon stacking a member having a light blocking effect on a bendable display. That is, the inventors of the present invention have found that the adhesive composition can be applied on an adherend by various applying methods, and is excellent in unevenness followability to the adherend, because of a liquid adhesive composition, and that dripping of the adhesive composition and a change in thickness of application are suppressed by irradiation with light after being applied thereonto, that sufficient working life can be ensured, and that the adhesive composition after completion of curing is bent in following various adherends, and is not peeled therefrom. The present invention has been made based on these findings.

That is, the following means can be provided according to the present invention:

[1] An adhesive composition, comprising:
  a polyalkylene oxide-added polyfunctional epoxy compound (a) represented by formula (A);
  a polyfunctional (meth)acrylate name (b); and
  a photo-acid generator (c):

Formula (A)

wherein R designates an alkylene group having 1 to 4 carbon atoms; X designates a divalent linking group having a ring structure and 6 to 20 carbon atoms, or an alkylene group having 1 to 4 carbon atoms; and, m and n each are 0, or a positive number, independently.

[2] The adhesive composition described in the item [1], wherein a content of the polyfunctional (meth)acrylate monomer (b) in the adhesive composition is 20 mass % or less.

[3] The adhesive composition described in the item [1] or [2], further comprising:
  a monofunctional epoxy compound (d) having a ring structure other than an oxirane ring.

[4] A method of bonding adherends A and B, comprising the following steps A and B in this order:
  step A: a step of applying the adhesive composition described in any one of the items [1] to [3] onto the adherend A; and step B: a step (i) of increasing (thickening) viscosity at 25° C. of the adhesive composition to 1 Pa·s or more, by irradiating the adhesive composition with light, to activate the photo-acid generator (c); and a step (ii) of stacking the adherend B on the thus-thickened adhesive composition.

[5] A method of producing a stack formed by bonding adherends A and B, comprising the following steps A and B in this order:
  step A: a step of applying the adhesive composition described in any one of the items [1] to [3] onto the adherend A; and
  step B: a step (i) of increasing viscosity at 25° C. of the adhesive composition to 1 Pa·s or more, by irradiating the adhesive composition with light, to activate the photo-acid generator (c); and a step (ii) of stacking the adherend B on the thus-thickened adhesive composition.

In this specification, the term "(meth)acrylate" may be any of a methacrylate and an acrylate, and is used as a collective term. Accordingly, this term includes either one of a methacrylate and an acrylate, and a mixture thereof.

In this specification, when there are plural substituents or linking groups indicated with specific reference symbols, or plural substituents or the like (in the same manner as in the definition of the number of substituents) are simultaneously or alternatively defined, the respective substituents or the like may be identical to or different from each other.

In this specification, the numerical range expressed by using the expression "to" means a range including numerical values before and after the expression "to" as the lower limit and the upper limit.

Effects of Invention

The adhesive composition of the present invention can be applied onto an adherend by various methods such as spraying and inkjet application, upon applying the adhesive composition thereonto, and the thus-applied adhesive composition is excellent in unevenness followability to the adherend. Dripping of the adhesive composition and a change in thickness of application are suppressed by irradiation with ultraviolet light after being applied thereonto. Further, the adhesive composition can be provided, which is bent in following any of various adherends after being cured, and is not peeled therefrom. Moreover, the present invention can provide: a method of bonding an adherend, wherein, in preparation of a bendable member such as a display, various adherends can be efficiently bonded, by using the above-described adhesive composition which is excellent in various performances; and a method of producing a stack formed by bonding the adherends.

Other and further features and advantages of the invention will appear more fully from the following description, appropriately referring to the accompanying drawings.

BRIEF DESCRIPTION OF DRAWINGS

FIGS. 2(a) and 2(b) each are an explanatory drawing of a mandrel bend test in which evaluation of bend strength in [Test Example 3] is performed in Example according to the present invention. In the same figure.

MODE FOR CARRYING OUT THE INVENTION

<Adhesive Composition>

The adhesive composition of the present invention contains a polyalkylene oxide-added polyfunctional epoxy compound (a), a polyfunctional acrylate monomer (b), and a photo-acid generator (c).

The adhesive composition of the present invention has low viscosity before irradiation with light (preferably, ultraviolet light, and the same applies hereinafter.), and therefore it can be applied onto an adherend by any of various methods, such as spraying and inkjet application. Moreover, the thus-applied adhesive composition is excellent in unevenness followability to the adherend. Further, the adhesive composition of the present invention is a retarded curing adhesive in which a curing reaction to be started by irradiation with ultraviolet light slowly progresses (namely, having retarded curability), and therefore sufficient working life (time in which working can be made after start of curing the adhesive composition by irradiation with light) can be ensured even after irradiation with ultraviolet light, and the curing reaction can be accelerated by heating the adhesive composition. Accordingly, for example, both can be stacked by applying the adhesive composition of the present invention onto a surface of a display substrate, and then irradiating the adhesive composition with ultraviolet light, and then stacking the adhesive composition irradiated with ultraviolet light on a polarizing plate, and further by heating the resultant material. Thus a substrate or a member each having low light transmission can be stacked thereon. Moreover, the adhesive composition of the present invention is applied onto a member for stack, and the resultant material is irradiated with light, to activate the photo-acid generator, and then the member can also be stacked on the display substrate within the working life. Thus, a degree at which a display is exposed to ultraviolet light or heat upon stacking the member thereon is reduced, and damage onto the display substrate can also be reduced.

Hereinafter, each component in the adhesive composition of the present invention will be described.

(Polyalkylene Oxide-Added Polyfunctional Epoxy Compound (a))

The polyalkylene oxide-added polyfunctional epoxy compound (a) to be used in the present invention, is represented by formula (A).

Formula (A)

In formula (A), R designates a lower alkylene rouge (e.g., preferably an alkylene group having 1 to 4 carbon atoms); X designates a divalent linking group having a ring structure and 6 to 20 carbon atoms, or a lower alkylene group (e.g., preferably an alkylene group having 1 to 4 carbon atoms); and m and n each are 0, or a positive number, independently.

The number of carbon atoms in R is preferably 2 or 3, and most preferably 2. Examples of the alkylene group having 1 to 4 carbon atoms represented by R include methylene, ethylene, 1,2-propylene, 1,3-propylene, 1,4-butylene, and 2,4-butylene. Among those, ethylene, and 1,3-propylene are preferable; and ethylene is more preferable.

A polyethylene oxide-added epoxy compound in which R is an ethylene group can develop good retarded curability. A polypropylene glycol-added epoxy compound in which R is a 1,3-propylene group, exhibits lower retarded curability by a steric effect of a methyl group in comparison with the polyethylene oxide-added epoxy compound.

Herein, the polyalkylene oxide-added polyfunctional epoxy compound (a) to be used in the present invention, may be a mixture of compounds represented by formula (A) in which the number of repetition of an alkylene oxide structure is different. In this case, the estimated average number of repetition of the alkylene oxide structure in one molecule of the compound represented by formula (A), is expressed as a sum: and therefore the sum: m+n takes no integer in several cases. In addition, the estimated average number of repetition can be calculated, by mass spectrometry (for example, FAB (fast atom bombardment) mass spectrometry) by soft ionization in which fragmentation of a sample is hard to occur.

From a viewpoint of development of good retarded cure, the sum: m+n is preferably 12 or less, more preferably 10 or less, and further preferably 8 or less. Moreover, from a viewpoint of development of good bendability in the adhesive composition after completion of cure (hereinafter, simply referred to as "a cured body"), the sum: m+n are preferably 2 or more, more preferably 4 or more, and further preferably 6 or more.

As an alkylene group having 1 to 4 carbon atoms in X, the description of the alkylene group having 1 to 4 carbon atoms in R can be preferably applied thereto.

The divalent linking group having a ring structure and 6 to 20 carbon atoms in X has preferably 6 to 18 carbon atoms, more preferably 6 to 15 carbon atoms. In addition examples of the atom for forming the group include a carbon atom, an oxygen atom, and a nitrogen atom. Among those, a carbon atom preferable.

The ring structure may be any of an aromatic ring and an aliphatic ring. The aromatic ring has preferably 6 to 14 carbon atoms, and preferred examples thereof include a benzene ring. The aliphatic ring has preferably 3 to 14 carbon atoms, and preferred examples thereof include a cyclohexane ring.

As the divalent linking group having the ring structure and 6 to 20 carbon atoms in X, in view of a large free volume in the cured body and capability of forming a large void, a linking group is preferable, which has a cyclohexane structure, a bisphenol-type structure represented by formula (Aa), a dicyclopentadiene structure, and a hydrogenated derivative structure thereof.

Formula (Aa)

In formula (Aa), $R^1$ designates an alkyl group (e.g., an alkyl group having preferably 1 to 10 carbon atoms, more preferably 1 to 3 carbon atoms, and further preferably 1 carbon atom); $R^2$ designates a hydrogen atom, an alkyl group (e.g., an alkyl group having preferably 1 to 5 carbon atoms, more preferably 1 to 3 carbon atoms, and further preferably 1 carbon atom), or a cycloalkyl group (e.g., a cycloalkyl group having preferably 3 to 5 carbon atoms, more preferably 3 carbon atoms). p is an integer of 0 to 4 (preferably 0 or 1, and more preferably) 0). * designates a linking site.

Above all, a divalent linking group in which $R^2$ is a methyl group and p is 0 in formula (Aa), namely, a bisphenol A-type linking group is preferable.

Herein, bisphenol A diglycidyl ether, bisphenol F diglycidyl ether, or the like, being widely used as an epoxy adhesive, has no polyalkylene oxide structure. Thus, the cured body of the adhesive composition using such a component does not exhibit sufficient bendability, and the adhesive composition does not develop retarded cure.

From a viewpoint of improving the followability of the adhesive composition of the present invention and to the adherend of the cured body thereof, a molecular weight or a mass average molecular weight of the polyalkylene oxide-added polyfunctional epoxy compound (a) is preferably 1,000 or less, more preferably 800 or less, and further preferably 600 or less. A lower limit is not particularly limited, but is preferably 300 or more, and more preferably 400 or more.

Herein, the mass average molecular weight can be measured (or calculated) by gel permeation chromatography (GPC) using, for example, a GPC system manufactured by Waters Corp. (column: "SHODEX K-804 (trade name)" (polystyrene gel), manufactured by Showa Denko K.K., mobile phase: chloroform), as molecular weight relative to polystyrene standards.

Examples of available polyalkylene oxide-added polyfunctional epoxy compound (a) as a commercial product include "RIKARESIN" series, such as trade name "RIKARESIN BPO-20E (molecular weight: 457)" and trade name "RIKARESIN BEO-60E (molecular weight: 541)", manufactured by New Japan Chemical Co., Ltd.

A content of polyalkylene oxide-added polyfunctional epoxy in the adhesive composition is preferably 5 mass % to 90 mass %. From a viewpoint of good bend endurance of the cured body, the content is more preferably 20 mass % or more, and further preferably 35 mass % or more. Moreover, from a viewpoint of applicability onto the adherend, the content is more preferably 70 mass % or less, and further preferably 60 mass % or less.

(Polyfunctional (Meth)Acrylate Monomer (b))

The polyfunctional (meth)acrylate monomer (b) to be used in the present invention has two or more polymerizable groups in one molecule. Thus, the adhesive composition of the present invention exhibits high thickening property by irradiation with light. Herein, the polymerizable group means a photoradically polymerizable group by the photo-acid generator (c), and specific examples thereof include a group having a carbon-to-carbon unsaturated double bond, such as a vinyl group and a (meth)acryloyl group. In addition, a sufficient thickening effect by irradiation with light (ultraviolet light) is unable to be obtained by a mono-functional (meth)acrylate monomer.

The number of polymerizable groups in one molecule of the polyfunctional (meth)acrylate monomer is preferably 2 to 4, more preferably 2 or 3 and further preferably 2. Above, all, a polyfunctional (meth)acrylate monomer having two (meth)acryloyl groups in one molecule is particularly preferable.

Moreover, the polyfunctional (meth)acrylate monomer also preferably has a bulky structure in the molecule. Specific examples of the bulky structure include a cyclohexane skeleton, a dicyclopentadiene skeleton, a bisphenol A skeleton, and a hydrogenated derivative thereof. The above-described polyfunctional (meth)acrylate monomer having the bulky structure has a large thickening effect even in a small amount thereof.

On the other hand, a polyfunctional (meth)acrylate monomer having a linear olefin structure in the molecule without containing the bulky structure, such as 1,6-hexanediol diacrylate and 1,9-nonanediol diacrylate, has a small thickening effect by irradiation with light (ultraviolet light), in which an increase in viscosity after irradiation is moderate. In addition, in comparison with the above-described polyfunctional (meth)acrylate monomer having the linear olefin structure in the molecule without having the bulky structure, the above-described polyfunctional (meth)acrylate monomer having the bulky structure in the molecule has better compatibility with the polyalkylene oxide-added polyfunctional epoxy compound (a), which is preferable. If the compatibility with the polyalkylene oxide-added polyfunctional epoxy compound (a) is good, phase separation in the cured body can be suppressed.

Moreover, in view of improving storage stability in a compound being non-reactive with an epoxy group, the polyfunctional (meth)acrylate monomer to be used in the present invention is preferable. That is, it is preferable not to have a hydroxy group, a carboxyl group or an acid anhydride skeleton any of which is easily reactive with the epoxy group, because the increase in viscosity of the adhesive composition by long-term storage can be suppressed.

With regard to a content of the polyfunctional (meth) acrylate monomer in the adhesive composition, in view of setting of the viscosity at which dripping is not caused by thickening after irradiation with light (ultraviolet light), a lower limit is preferably 1 mass % or more. In view of suppressing a thickness change of the adhesive composition by an effect of the polyfunctional (meth)acrylate monomer after being applied thereonto, the lower limit is more preferably 2 mass % or more, and further preferably 5 mass % or more. Moreover, in view of suppressing causing of the phase separation in the cured body, an upper limit is preferably 20 mass % or less. Also in view of ensuring sufficient unevenness followability to the adherend, the upper limit is preferably 20 mass % or less, and more preferably 15 mass % or less. If the content of the polyfunctional (meth)acrylate monomer is within the above-described preferable upper limit, the adhesive composition is not instantaneously cured by irradiation with ultraviolet light, and the retarded curing-type adhesive composition can be prepared, in which sufficient working life can be ensured after irradiation with light.

From a viewpoint of compatibility with other constitutional materials, a molecular weight of the polyfunctional (meth)acrylate monomer is preferably 150 or more, and more preferably 200 or more. From a viewpoint of the viscosity of the adhesive composition, the molecular weight is preferably 500 or less, and more preferably 350 or less.

(Photo-Acid Generator (c))

It is, considered that the photo-acid generator to be used in the present invention absorbs energy by irradiation with light, thus, the photo-acid generator is decomposed to generate Bronsted acid or Lewis acid and a radical, and the (meth)acrylate monomer is polymerized by this radical, and the epoxy group is polymerized by a cation. Thus, in the present invention, a (meth)acrylate component can be polymerized without adding any further radical generator or polymerizing the (meth)acrylate component.

In the case of a typified triarylsulfonium salt, as a photolysis mechanism of the photo-acid generator, reactions are considered to progress by formulas described below. Formulas (1) and (2) each show a reaction in which a photo-acid generator absorbs light and is decomposed. Formulas (3) and (4) each show a reaction in which $Ar_2S^+\bullet$ generated in formula (2) abstracts hydrogen from, to generate acid. Formulas (5) and (6) each show a reaction of $Ar\bullet$ generated in formula (2). In addition, in formulas, Ar represents an aryl group, X represents an anion component, and YH represents an alkane.

In particular, the adhesive composition of the present invention, contains the polyalkylene oxide-added polyfunctional epoxy compound (a) represented by formula (A), the polyfunctional (meth)acrylate monomer (b), and the photo-acid generator (c). Thus, it is estimated that the sufficient working life can be ensured, by progress of the following reactions by irradiation with light.

That is, the photo-acid generator (c) is decomposed by irradiation with light to generate the radical and the cation, and the radical accelerates polymerization of the polyfunctional (meth)acrylate monomer (b), and the cation accelerates polymerization of the polyalkylene oxide-added polyfunctional epoxy compound (a) or a monofunctional epoxy compound (d) having a ring structure other than an oxirane ring as described later. Herein, in the polyfunctional (meth)acrylate monomer (b), radical polymerization by irradiation with light significantly rapidly progresses to achieve high molecular weight. Thus, the viscosity of the adhesive composition of the present invention is moderately increased. On the other hand, in the polyalkylene oxide-added polyfunctional epoxy compound (a), cationic polymerization slowly progresses at ordinary temperature, and thus does not significantly contribute to the increase in viscosity of the adhesive composition of the present invention. Therefore, the sufficient working life can be ensured in the adhesive composition of the present invention.

Further, it is estimated that the cationic polymerization of the polyalkylene oxide-added polyfunctional epoxy compound (a) is accelerated by heating after stacking, on another adherend, the resultant adherend onto which the adhesive composition of the present invention is applied, in which the polyfunctional (meth)acrylate monomer (b) is radically polymerized by irradiation with light, and dripping and the thickness change are suppressed, and polymerization and curing progress, and the adherends are bonded.

The photo-acid generator is preferably contained in an amount of 0.1 to 10 mass % in the adhesive composition of the present invention. In order to obtain a sufficient degree of curing, 0.5 mass % or more is preferable. Moreover, in an application in which transparency is required, in view of suppressing coloring by the photo-acid generator, 5 mass % or less is preferable.

The photo-acid generator is a salt mainly composed of an onium ion (cation component) and a non-nucleophilic anion component.

Specific examples of the cation component include an ion of an element in group 15 of the periodic table, such as an ammonium compound ion, a pyridinium compound ion, and a triphenylphosphonium compound ion; an ion of an element in group 16 thereof, such as a sulfonium compound ion (including a triarylsulfonium ion, an aromatic sulfonium compound ion, and an aliphatic sulfonium compound ion), and a selenium compound ion; an ion of an element in group 17 thereof, such as a diarylchloronium compound ion, a bromonium ion, and an iodonium ion; and an iron-arene complex.

Among those, an ion component, such as an iodonium ion, a sulfonium compound ion, and an ammonium compound ion, is preferable, a sulfonium compound ion is more preferable, and in view of excellent thermal stability as the salt, a triarylsulfonium ion is further preferable.

A light absorption region of a sulfonium salt-based photocationic polymerization initiator is up to a region near 360 nm in a methanol solution. Therefore, upon curing the adhesive composition of the present invention, an influence on a dye which absorbs a wavelength of 360 nm or more can be reduced by irradiation with light by cutting ultraviolet light in 360 nm or more, which is preferable.

Specific examples of the anion component include perfluoride of elements in group 13 or group 15 of the periodic table (anion residue of super-strong acid), such as $BF_4^-$, $B(C_6F_5)_4^-$, $Ga(C_6F_5)_4^-$, $PF_6^-$, $PF_IRf_{(6-I)}^-$ (Rf: perfluoroalkyl group, I=an integer from 0 to 5), $AsF_6^-$, and $SbF_6^-$.

Among those, $SbF_6^-$, $PF_6^-$, $PF_IRf_{(6-I)}^-$), and $Ga(C_6F)_4^-$ are preferable.

The photo-acid generator is the salt, and thus from a viewpoint of solubility in an organic compound, an arylsulfonium salt is preferable, and, a photo-acid generator in which perfluoride (particularly preferably, $PF_IRf_{(6-I)}^-$) is used in the anion component is more preferable.

Examples of commercially available photo-acid generator include CPI-100P, CPI-101A, CPI-110S, CPI-200K, CPI-210S and CPI-500K (each trade name, triarylsulfonium salt, manufactured by San-Apro Ltd.): Adekaoptomer SP series (trade name, aromatic sulfonium salt, manufactured by ADEKA CORPORATION); CP series (trade name, aliphatic sulfonium salt, manufactured by ADEKA CORPORATION); K-PURE (register trade, mark) TAG and CXC series (each trade name, manufactured by KING INDUSTRIES); and SAN-AID SI series. SI-150L, SI-110L, SI-60L, SI-80L and SI-100L (each trade name, aromatic sulfonium salt, manufactured by SANSHIN CHEMICAL INDUSTRY CO., LTD.).

(Monofunctional Epoxy Compound (d) Having a Ring Structure Other than Oxirane Ring)

From a viewpoint of an improvement in peel strength, it is also preferable that the adhesive composition of the present invention further contains the monofunctional epoxy compound (d) having the rind structure other than the oxirane ring.

A molecular weight of this monofunctional epoxy compound (d) having the ring structure other than the oxirane ring, is preferably 150 or more. An upper limit thereof is not particularly limited, but is preferably 1,000 or less, and because the viscosity of the adhesive composition is lowered, is more preferably 500 or less.

As the ring structure other than the oxirane ring, both a monocyclic compound and a polycyclic compound may be applied, but a polycyclic compound is more preferable. Moreover, it is also preferable to include a hetero atom (for example, an oxygen atom, a nitrogen atom, a sulfur atom, and a selenium atom) as an atom that constitutes the ring structure, and it is preferable to have a structure of a heterocyclic compound as the ring structure other than the oxirane ring because adhesive strength is improved by the hetero atom.

The number of atoms for forming the ring structure is, preferably 3 to 20, more preferably 5 to 18, and further preferably 6 to 16.

Specific examples include a benzene ring, a biphenyl ring, and a phthalic acid skeleton.

Examples of the monofunctional epoxy compound (d) having such a ring, structure other than the oxirane ring include "EPIOL TB (p-tert-butylphenyl glycidyl ether; molecular weight: 206)" manufactured by NOF CORPORATION; "PGE (phenyl glycidyl ether; molecular weight: 152)" "SY-OCG (o-cresyl glycidyl ether; molecular weight: 180", "m, p-CGE (m, p-cresyl glycidyl ether; molecular weight: 165)", and "SY-OPG (o-phenyphenol glycidyl ether; molecular weight: 230)", each manufactured by SAKAMOTO YAKUHIN KOGYO CO., LTD.; "OPP-G (2-phenylphenol glycidyl ether; molecular weight: 226)" manufactured by SANKO CO., LTD.; and "EX-142 (2-phenyphenol glycidyl ether; molecular weight: 226)" and "EX-731 (N-glycidyl phthalimide; molecular weight: 203)", each manufactured by Nagase ChemteX Corporation, Herein, a trade name is described in double quotation marks, and a compound name is described in parentheses, respectively.

A content of the monofunctional epoxy compound having the ring structure in the adhesive composition of the present invention, is preferably 5 mass % to 70 mass %. From a viewpoint of prevention of peeling upon bending, the content is more preferably 15 mass % or more, and further preferably 25 mass % or more. From a viewpoint of prevention of lowering of mechanical strength and cohesive failure of the cured body by addition of the monofunctional epoxy compound (d), the content is more preferably 60 mass % or less, and further preferably 50 mass % or less.

(Additives)

In the present invention, further, any of various additives can be appropriately used in an amount in the range in which an effect of the adhesive composition of the present invention is not adversely affected.

For example, in order to impart the cured body with flexibility, as a flexibilizer a (meth)acrylate compound may be appropriately incorporated thereinto in which an end of polyolefin having a molecular weight of 1,000 to 100,000, such as polybutadiene, is (meth)acrylated through a urethane bond, an ester bond or an ether bond. From a viewpoint of compatibility, a content of the (meth)acrylate compound of polyolefin as described above is preferably 30 mass % or less in the adhesive composition of the present invention.

Examples of commercially available flexibilizers include CN307, CN308, CN309, CN310 and CN9014 (each trade name, manufactured by Arkema); TEAI-1000, TE-2000 and EMA3000 (each trade name, manufactured by Nippon Soda Co., Ltd.); BAC-45 and SPBDA-S30 (each trade name, manufactured by Osaka Organic Chemical Industry Ltd.); and DENALEX R-45EPT (trade name, manufactured by Nagase ChemteX Corporation).

Further, a tackifier having a low molecular weight may be appropriately added thereto.

As the tackifier, use may be made of any of rosin of a natural resin, a terpene resin, polymeric rosin prepared by polymerizing or modifying rosin, a rosin ester, a hydrogenated rosin, a petroleum resin, or the like.

In addition thereto, it can be appropriately incorporated thereinto with an additive, e.g. a photoradical polymerization initiator, a thermal cationic polymerization initiator, a diluent, a plasticizer, a cross-linking aid, an antifoaming agent, a flame retardant, a polymerization inhibitor, a filler, or a coupling agent.

The description in a method of bonding the adherend or a method of producing a stack as described later, is preferably applied to, curing conditions and the working life, upon using the adhesive composition of the present invention.

A method of preparing the adhesive composition of the present invention is not particularly limited. The adhesive composition can be prepared, for example, in a usual manner, in which the polyalkylene oxide-added polyfunctional epoxy compound (a) represented by formula (A), the polyfunctional (meth acrylate monomer (b), and the photo-acid generator (c), and any of the additive are blended together, followed by that the resultant mixture is stirred until the mixture would be uniformized. In addition, in order to prevent decomposition of the photo-acid generator (c), the adhesive composition is preferably prepared under light-blocking conditions.

Moreover, in order to prevent decomposition of the photo-acid generator (c), the adhesive composition of the present invention after preparation, is also preferably stored under blocking light.

<Method of Bonding an Adherend>

A method of bonding adherends A and B in which the adhesive co position of the present invention is used, includes the following steps A and B in this order:

step A: a step of applying the adhesive composition of the present invention onto the adherend A; and step B: a step (i) of increasing (thickening) viscosity at 25° C. of the adhesive composition to 1 Pa·s or more, by irradiating the adhesive composition with light, to activate the photo-acid generator (c); and a step (ii) of stacking the adherend B on the thus-thickened adhesive composition.

Figure 1:
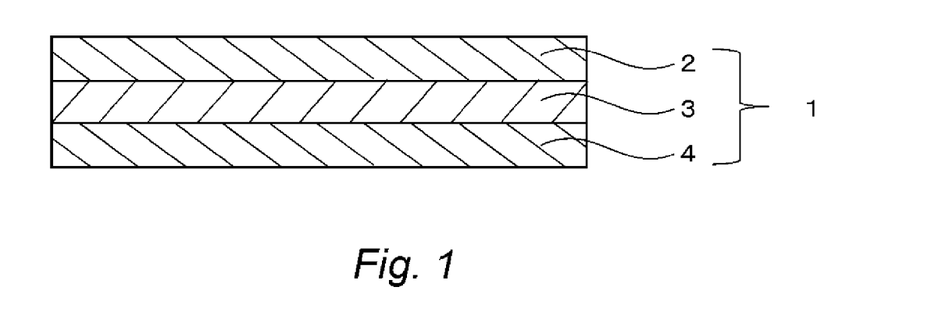
FIG. 1 shows a longitudinal cross-sectional view of an adhered film prepared in Example according to the present invention.

According to the method of bonding the adherend of the present invention, an adhered film (1), as shown in FIG. 1, can be obtained, which has a stacked structure of: the adherend A (2)/the cured adhesive composition (the cured body 3)/the adherend B (4).

<Method of Producing a Stack>

A method of producing the stack formed by bonding the adherends A and B in which the adhesive composition of the present invention is used, includes the following steps A and B in this order.

step A: a step of applying the adhesive composition of the present invention onto the adherend A; and step B: a step (i) of increasing viscosity at 25° C. of the adhesive composition to 1 Pa·s or more, by irradiating the adhesive composition with light, to activate the photo-acid generator (c); and a step (ii) of stacking the adherend B on the thus-thickened adhesive composition.

According to the method of producing the stack of the present invention, a stack (an adhered film 1), as shown in FIG. 1, can be obtained, which has the stacked structure of: the adherend A (2)/the cured adhesive composition (the cured body 3)/the adherend B (4).

Hereinafter, the adherends A and B and the steps (A) and (B), as described in the method of bonding an adherend and the method of producing a stack, are described in detail.

As a member of the adherends A and B each, a member composed of a raw material, such as polyethylene terephthalate (PET), polyethylene naphthalate (PEN), polyimide (PI), a cycloolefin polymer (COP), a cycloolefin copolymer (COC), glass, and metallic foil; or a member, such as a touch panel, a color filter, a polarizing plate, a protective film, a display substrate, a flexible printed-circuit board, and a flexible battery, can be adhered according to the bonding method of the present invention. Above all, upon bonding members each having a light blocking effect, in which the adherends A and B each are a member having bendability, the effect by the bonding method and the production method in which the adhesive composition of the present invention is used is further developed. Such members are preferably used, for example, in bonding a bendable display substrate and the member and in producing the stack formed by bonding the members.

(Step A)

The adhesive composition of the present invention can be applied onto the adherend A in a usual manner. In particular, the adhesive composition of the present invention is liquid at low viscosity, and thus use is preferably made of any of applying methods, such as slit coating, an inkjet method, a spraying method, a dispensing method, or the like. Herein, "the adhesive composition, of the present invention is liquid" means that the adhesive composition is liquid (preferably 0.01 Pa·s to 50 Pa·s) at 5° C. to 200° C. Moreover, from a viewpoint of applying the adhesive composition of the present invention onto the adherend A, and then stacking the adherend B thereon in the step B, "the adhesive composition of the present invention is liquid" means that the adhesive composition, which is in a state without containing any solvent, is liquid.

A thickness of application of the adhesive composition of the present invention is appropriately selected according to a purpose, but when the adhesive composition is adapted to a member intended for bending, as the thickness of application is smaller, stress strain generated inside and outside bending is made smaller, and peeling becomes hard to occur, which is preferable. Specifically, the thickness of application is preferably 100 μm or less, and more preferably 50 μm or less. Moreover, in view of unevenness followability to the adherends A and B, the thickness of application is preferably larger. Specifically, the thickness of application is preferably 2 μm or more, and more preferably 10 μm or more.

(Step B)

(i) Conditions of irradiation with light for activating the photo-acid generator (c), are appropriately selected depending on a content of the photo-acid generator (c) in the adhesive composition, the thickness of application of the adhesive composition, a water content contained in the adhesive composition, or the like, but in view of capability of obtaining the sufficient working life, specific examples thereof preferably include the following conditions.

That is, the adhesive composition of the present invention, being applied onto the adherend A, is preferably irradiated with ultraviolet light having an irradiation intensity (radiant power) of 5 to 100 mW/cm$^2$ and a dose of 100 to 5,000 mJ/cm$^2$.

When acceleration of a curing speed is wanted, after irradiation with ultraviolet light, (ii) the adherend B is also preferably heated, after being stacked thereon, and such an aspect is also a preferable embodiment as the step B Heating temperature is preferably 50 to 150° C., and heating time is preferably 0.5 to 24 hours. Heating can be performed in a usual manner for example, by heating with a heating furnace.

The dose of ultraviolet light is adjusted in the above-described range, and thus, the cured body having sufficient hardness can be obtained, without deteriorating a peripheral material of the adherend or the like, which is preferable. In view of eliminating an influence of moisture or a substance having curing-inhibition characteristics existing in the air or on a surface of the adherend, in order to stably obtain the cured body, the dose is the preferably 1,000 mJ/cm$^2$ or more.

The adhesive composition of the present invention after being applied onto the adherend A, is thickened, by irradiation with light, to 1 Pa·s or more in viscosity at 25° C. of the adhesive composition (hereinafter, referred to as viscosity (25° C.)). Thus, a thickness of the adhesive composition after being applied thereunto is not changed by vibration or the like generated by movement (conveyance) or the like after application of the adhesive composition thereonto, and a thickness of stack between the adherends A and B can be kept uniform. The viscosity (25° C.) after 0.5 minute (preferably, after 1 minute) from completion of irradiation with light, is preferably 1 Pa·s or more. From a viewpoint of heat-stacking the adherend A on the adherend B with good unevenness followability, the viscosity (25° C.) after 0.5 minute (preferably, after 1 minute) from completion of irradiation with light, is preferably 1,000 Pa·s or less, and from a viewpoint of stacking the adherend A on the adherend B with good unevenness followability without heating the resultant stack, the viscosity (25° C.) after 0.5 minute (preferably, after 1 minute) from completion of irradiation with light, is more preferably 100 Pa·s or less. In addition, after completion of irradiation with light, the viscosity up to time after 6 hours is preferably the above-described upper limit or less.

Herein, the viscosity means complex viscosity to be measured by an apparatus and a method described in Examples.

The working life (time in which work can be made, after start of curing of the adhesive composition by irradiation with light) in the bonding method and the production method of the present invention, means the time in which work can be made, namely after completion of (i) irradiation with light in the step B, (ii) the adherend B can be stacked thereon. The working life in the present invention is, although a level is different depending on conditions of irradiation with light and the thickness of application of the adhesive composition, 0.5 minute to 6 hours, in which good workability can be ensured in stack between the adherends A and B.

Then, (ii) the adherend B is stacked on the adhesive composition, after the adhesive composition applied onto the adherend A is thickened by irradiation with light in (i). Herein, when either the adherend A or B is translucent, both can also be adhered by applying the adhesive composition of the present invention thereonto, and then stacking the adherends A and B through the adhesive composition applied thereon, performing irradiation with light from a side of a translucent adherend, and heating the resultant stack.

Of course, also upon stacking a member having a light blocking effect or the adherend (the member) containing a photoreactive compound thereon, such operation can also be preferably applied thereto.

According to the method of bonding the adherend of the present invention, one we or more adherends can also be further bonded on the adherend A and/or adherend B, to the adhered film (1) having the stacked structure of: the adherend A (2)/the cured adhesive composition (the cured body 3)/the adherend B (4), as shown in FIG. 1.

Moreover, according to the method of producing the stack of the present invention, the stack can also be produced, in which one, two or more adherends are stacked thereon through the cured body 3 further on the adherend A and/or adherend B, to the stack (the adhered film 1) having the stacked structure of: the adherend A (2)/the cured adhesive composition (the cured body 3)/the adherend B (4) as shown in FIG. 1.

EXAMPLES

The present invention will be described in more detail based on examples given below, but the invention is not meant to be limited by these.

Example 1

The adhesive composition was prepared, by blending, as the polyalkylene oxide-added polyfunctional epoxy compound (a), RIKARESIN BEO-60E (trade name, manufactured by New Japan Chemical Co., Ltd.), as the polyfunctional (meth)acrylate monomer (b), A-NOD-N (trade name: manufactured by Shin Nakamura Chemical Co., Ltd.), and as the photo-acid generator (c), CPI-200K (trade name: manufactured by San-Apro Ltd.), in a mass ratio as shown in Table 1, and the resultant mixture was stirred until the mixture is uniformized.

The thus-prepared adhesive composition was applied, which would be 20 μm in thickness, onto a 25 μm-thick PET film (trade name: "G2", manufactured by Teijin DuPont Films Japan Limited); and the resultant PET film was irradiated with ultraviolet light at 50 mW/cm² for 60 seconds (dose: 2,000 mJ/cm²), by using an ultraviolet irradiation apparatus (trade name: US5-0151, manufactured by EYE GRAPHICS CO., LTD). Further, a 25 μm-thick PET film (trade name: "G2", manufactured by Teijin DuPont Films Japan Limited) was stacked on the thus-applied adhesive composition, after 1 hour from completion of irradiation with ultraviolet light. By putting, in a heating furnace at 90° C. for 60 minutes, the thus-obtained adhesive composition interposed with the two PET films, the adhered film (1) was obtained, which had a configuration as shown in FIG. 1, in which two PET films were adhered with the adhesive composition (3) after completion of curing. The thus-obtained adhered film was cut into 25 mm×100 mm, and the resultant film was used as a film for testing as described below.

Examples 2 to 10 and Comparative Examples 1 to 3

Adhesive compositions in Examples 2 to 10 and Comparative Examples 1 to 3 were prepared in the same manner as in Example 1, except that the component(s) of the adhesive composition was (or were) changed to the component(s) of the kind(s) and in the mass ratio of blending as described in Table 1, in Example 1. Adhered films (1) each having a configuration as shown in FIG. 1 and films for testing were obtained in the same manner as in Example 1, except that the adhesive composition obtained was used.

Herein, the adhesive compositions prepared in Examples 1 to 10 all were liquid at 23° C.

[Test Example 1] Evaluation of Thickening Characteristics

The adhesive composition prepared as described above was applied onto a 25 μm-thick PET film (trade name: "G2", manufactured by Teijin DuPont Films Japan Limited) at a thickness of 20 μm; and the resultant PET film was irradiated with ultraviolet light at 50 mW/cm² for 60 seconds (dose: 2,000 mJ/cm²), by using an ultraviolet irradiation apparatus (trade name: US5-0151, manufactured by EYE GRAPHICS CO., LTD.). With regard to the adhesive composition after irradiation with ultraviolet light, complex viscosity n* after 1 minute from completion of irradiation with ultraviolet light, was measured, at ordinary temperature (25° C.) at an angular rate having a shear rate of $1\ s^{-1}$, by using a cone plate having a cone diameter of 25 mm and a cone angle of 0.1 rad, in an apparatus for measuring viscoelasticity (apparatus name "ARES", manufactured by Rheometric Scientific, Inc.). Evaluation was performed in which a case where the complex viscosity n* after irradiation with ultraviolet light was less than 1 Pa·s was expressed as "x" (poor), and a case where the complex viscosity n* after irradiation with ultraviolet light was 1 Pa·s or more due to thickening (increase in viscosity) was expressed as "○" (good).

[Test Example 2] Evaluation of Peel Strength

Peel strength of the above-described film for testing was measured in accordance with JIS K6854-3 (Adhesives-Determination of peel strength of bonded assemblies—Part 3: Adhesives—180° peel test for flexible-to-flexible bonded assemblies (T-peel test)). Peel strength was measured in term of "N/25 mm". In Table below, the results were shown by omitting the unit.

[Test Example 3] Evaluation of Bend Strength

Figure 2A:
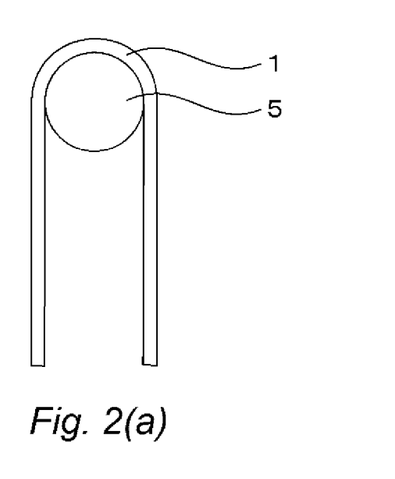
FIG. 2(a) shows a side view in which a state in which a film for testing is bent in half along an iron shaft, viewed from an axis line direction of the iron shaft.
Figure 2B:
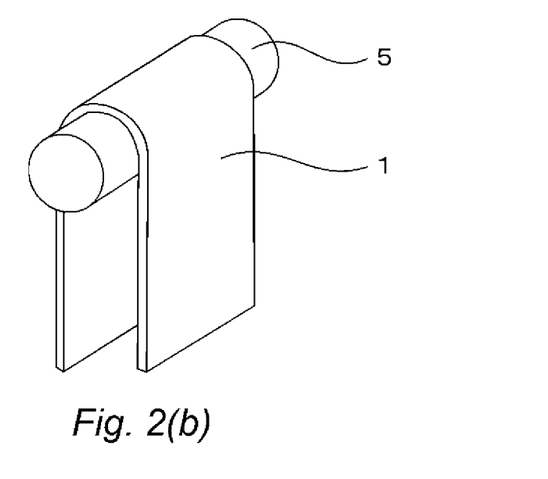
FIG. 2(b) shows a perspective view thereof.

Bend strength was evaluated according, to a mandrel bend test. The above-described film for testing, the film having 25 mm×100 mm, was bent in half to be 25 mm×50 mm along an iron shaft having a diameter of 1 mm as shown in FIG. 2, and generation of cracks and peel was observed Evaluation was performed, in which a test specimen having cracks and peel was expressed as "x" (poor), and a test specimen without crack and peel was expressed as "○" (good).

The results of Test Examples 1 to 3 are shown in Table below.

TABLE 1

| | | Ex 1 | Ex 2 | Ex 3 | Ex 4 | Ex 5 | Ex 6 | Ex 7 | Ex 8 | Ex 9 | Ex 10 | C Ex 1 | C Ex 2 | C Ex 3 |
|---|---|---|---|---|---|---|---|---|---|---|---|---|---|---|
| (A) | RIKARESIN BEO-60E | 74 | 79 | | | 50 | | | 57 | | | | 99 | 90 |
| | RIKARESIN BPO-20E | | | | 97 | | 50 | | | 54 | 57 | | | |
| | EPOLIGHT 200E | | | 89 | | | | | | | | | | |
| | EPOGOSEY PT (general grade) | | | | | | | 49 | | | | | | |
| | EPIKOTE 828 | | | | | | | | | | | 59 | | |
| (B) | A-DCP | | | | 2 | 10 | | | 2 | | 2 | 10 | | |
| | A-HD-N | | 20 | 10 | | | 10 | 10 | | | | | | |
| | A-NOD-N | 25 | | | | | | | | 10 | | | | |
| | PLACCEL FM2D | | | | | | | | | | | | | 9 |

TABLE 1-continued

|  |  | Ex 1 | Ex 2 | Ex 3 | Ex 4 | Ex 5 | Ex 6 | Ex 7 | Ex 8 | Ex 9 | Ex 10 | C Ex 1 | C Ex 2 | C Ex 3 |
|---|---|---|---|---|---|---|---|---|---|---|---|---|---|---|
| (C) | CPI-200K | 1 | 1 | 1 | 1 | 1 | 1 | 2 | 1 | 1 | 1 | 1 | 1 | 1 |
| (D) | PGE |  |  |  |  |  | 39 |  |  |  |  | 30 |  |  |
|  | EX-731 |  |  |  |  |  |  |  |  |  |  |  |  |  |
|  | EPIOL TB |  |  |  |  |  |  | 39 | 40 | 35 |  |  |  |  |
|  | OPP-G |  |  |  |  |  |  |  |  |  | 40 |  |  |  |
|  | EPOLIGHT M-1230 |  |  |  |  | 39 |  |  |  |  |  |  |  |  |
| Total |  | 100 | 100 | 100 | 100 | 100 | 100 | 100 | 100 | 100 | 100 | 100 | 100 | 100 |
| Test | Thickening characteristics | ○ | ○ | ○ | ○ | ○ | ○ | ○ | ○ | ○ | ○ | ○ | x | x |
| Results | Peel strength | 0.2 | 0.4 | 0.3 | 0.4 | 0.3 | 2 | 2 | 2.5 | 3.5 | 3.5 | 0.2 | 0.4 | 0.4 |
|  | Bend strength | ○ | ○ | ○ | ○ | ○ | ○ | ○ | ○ | ○ | ○ | x | ○ | ○ |

Note:
"Ex" means Example, and "C Ex" means Comparative Example.
<Notes in Table>
(A) Epoxy resin
Polyalkylene oxide-added polyfunctional epoxy compound (a)
RIKARESIN BEO-60E: trade name, manufactured by New Japan Chemical Co., Ltd., bisphenol A bis(triethylene glycol glycidylether)ether, molecular weight: 541
RIKARESIN BPO-20E: trade name, manufactured by New Japan Chemical Co., Ltd., bisphenol A bis(propylene glycol glycidylether)ether, molecular weight: 457
EPOLIGHT 200E: trade name, manufactured by Kyoeisha Chemical Co., Ltd., polyethyleneglycol #200 diglycidyl ether, molecular weight: 322
EPOGOSEY PT (general grade): trade name, manufactured by Kyoeisha Chemical Co., Ltd., polyethyleneglycol diglycidyl ether, molecular weight: 870
Epoxy compound having no polyalkylene oxide structure
EPIKOTE 828: trade name, manufactured by Mitsubishi Chemical, bisphenol A diglycidyl ether, molecular weight: 340
(B) (Meth)acrylate monomer
Polyfunctional (meth)acrylate monomer (b)
A-DCP: trade name, manufactured by Shin Nakamura Chemical Co., Ltd., tricylodecane dimethanol diacrylate, molecular weight: 304
A-HD-N: trade name, manufactured by Shin Nakamura Chemical Co., Ltd., 1,6-hexanediol diacrylate, molecular weight: 226
A-NOD-N: trade name, manufactured by Shin Nakamura Chemical Co., Ltd., 1,9-nonanediol diacrylate, molecular weight: 268
Monofunctional (meth)acrylate monomer
PLACCEL FM2D: trade name, manufactured by DAICEL CORPORATION, (monofunctional) unsaturated fatty acid hydroxyalkyl ester-modified ε-caprolactone, molecular weight: 358
(C) Photo-acid generator (c)
CPI-200K: trade name, manufactured by San-Apro Ltd., triarylsulfonium salt (propylene carbonate 50 wt % solution)
(D) Monofunctional epoxy compound
Monofunctional eopxy compound (d) having a ring structure
PGE: trade name, manufactured by SAKAMOTO YAKUHIN KOGYO CO., LTD., phenyl glycidyl ether, molecular weight: 152
EX-731: trade name, manufactured by Nagase ChemteX Corporation, N-glycidyl phthalimide, molecular weight: 203
EPIOL TB: trade name, manufactured by NOF CORPORATION, p-tert-butyphenyl glycidyl ether, molecular weight: 206
OPP-G: trade name, manufactured by SANKO CO., LTD., 2-phenylphenol glycidyl ether, molecular weight: 226
Monofunctional epoxy compound having no ring structure
EPOLIGHT M-1230: trade name, manufactured by Kyoeisha Chemical Co., Ltd., higher alcohol glycidyl ether, molecular weight: 295 to 320

As a result of each Test Example described above, bend strength was insufficient in Comparative Example 1 in, which the polyfunctional epoxy compound having no polyalkylene oxide structure was used; and sufficient thickening characteristics were not obtained in both Comparative Example 2 in which the monofunctional (meth)acrylate monomer was used, and Comparative Example 3 in which no polyfunctional (meth)acrylate monomer was contained.

In contrast, it is found that the adhesive composition of the present invention is excellent in all of the thickening characteristics, the peel strength and the bend strength. Moreover, according to the method of bonding the adherend in which the adhesive composition of the present invention is used, a member having a light blocking effect or a member containing a photoreactive compound can be bonded thereon. According to the method of producing the stack in which the adhesive composition of the present invention is used, a stack formed by bonding the member having the light blocking effect or the member containing the photoreactive compound thereon, can be produced.

Adhered films (1) each having the configuration as shown in FIG. 1 and films for testing were obtained in the same manner as in Examples 1 to 10, except that the stack of the PET films on the adhesive composition irradiated with ultraviolet light, was made by changing the time from after 1 hour from completion of irradiation with ultraviolet light to after 0.5 minute from completion of irradiation with ultraviolet light, in Examples 1 to 10. It is found that results in equivalent levels were obtained, respectively, in all of Test Examples 1 to 3, in comparison with each Example in which the adhesive composition having the same components was used.

Moreover, also when time from completion of irradiation with ultraviolet light was changed to after 6 hours therefrom, in the same manner as in the case where the time was made to after 0.5 minute therefrom, it is found that results in equivalent levels were obtained, respectively, in all of Test Examples 1 to 3, in comparison with each Example in which the adhesive composition having the same components was used.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2015-247963 filed in Japan on Dec. 18, 2015, which is entirely herein incorporated by reference.

REFERENCE SIGNS LIST 1 adhered film
2 member (adherend A)
3 cured body (the cured adhesive composition)
4 member (adherend B)
5 iron shaft

The invention claimed is:

1. An adhesive composition, comprising:
   a polyalkylene oxide-added polyfunctional epoxy compound (a) represented by formula (A);
   a polyfunctional (meth)acrylate monomer (b); and
   a photo-acid generator (c):

Formula (A)

wherein R designates an alkylene group having 1 to 4 carbon atoms; X designates a divalent linking group having a ring structure and 6 to 20 carbon atoms, or an alkylene group having 1 to 4 carbon atoms; and m and n each are 0, or a positive number, independently, wherein at least one of m and n is a positive number; and
   wherein a content of the polyfunctional (meth)acrylate monomer (b) in the adhesive composition is 20 mass % or less.

2. The adhesive composition as claimed in claim 1, further comprising:
   a monofunctional epoxy compound (d) having a ring structure other than an oxirane ring.

3. A method of bonding adherends A and B, comprising the following steps A and B in this order:
   step A: a step of applying the adhesive composition as claimed in claim 1 onto the adherend A; and
   step B: a step (i) of increasing viscosity at 25° C. of the adhesive composition to 1 Pa·s or more, by irradiating the adhesive composition with light, to activate the photo-acid generator (c); and a step (ii) of stacking the adherend B on the thus-thickened adhesive composition.

4. A method of producing a stack formed by bonding adherends A and B, comprising the following steps A and B in this order:
   step A: a step of applying the adhesive composition as claimed in claim 1 onto the adherend A; and
   step B: a step (i) of increasing viscosity at 25° C. of the adhesive composition to 1 Pa·s or more, by irradiating the adhesive composition with light, to activate the photo-acid generator (c); and a step (ii) of stacking the adherend B on the thus-thickened adhesive composition.

* * * * *